United States Patent [19]

Baggett et al.

[11] 4,176,227

[45] Nov. 27, 1979

[54] PROCESS FOR INCORPORATING CAF$_2$ INTO POLYAMIDES

[75] Inventors: William M. Baggett; LeMoyne W. Plischke, both of Pensacola, Fla.

[73] Assignee: Monsanto Company, St. Louis, Mo.

[21] Appl. No.: 947,799

[22] Filed: Oct. 2, 1978

[51] Int. Cl.$^2$ ............................................. C08G 69/49
[52] U.S. Cl. ...................................... 528/488; 526/1; 528/323; 528/335; 528/490
[58] Field of Search ..................... 528/488, 481; 526/1

[56] References Cited

U.S. PATENT DOCUMENTS

| | | | |
|---|---|---|---|
| 3,529,929 | 9/1970 | Page et al. | 423/490 |
| 3,755,221 | 8/1973 | Hitch | 260/18 N |

*Primary Examiner*—Harold D. Anderson
*Attorney, Agent, or Firm*—John W. Whisler

[57] ABSTRACT

A process for incorporating CaF$_2$ into polyamides is described. The process involves reacting a calcium salt with a fluoride salt in molten polyamide.

11 Claims, No Drawings

PROCESS FOR INCORPORATING CAF$_2$ INTO POLYAMIDES

BACKGROUND OF THE INVENTION

1. Field of the Invention

The invention relates to a novel process for incorporating CaF$_2$ into a polyamide.

2. Description of the Prior Art

It is known from British Pat. No. 1,211,685, that polyamides having CaF$_2$ incorporated therein as a nucleating agent can be melt spun into filaments at higher spinning temperatures and at a higher extrusion rates than when the CaF$_2$ is omitted from the polyamide. It is further known from this patent that the CaF$_2$ is incorporated into a polyamide by injecting an aqueous CaF$_2$ slurry thereof into the salt solution during the polymerization process (e.g. during the second cycle) by which the polyamide is produced or by melting polyamide flake which has been coated with CaF$_2$. According to the patent CaF$_2$ is prepared by the well-known process of double-decomposition of suitable calcium and fluoride salts in aqueous solution at or near the boiling point. Upon mixing the salts, CaF$_2$ precipitates in the aqueous medium and may be recovered therefrom as a paste or slurry such as by filtration or centrifugation followed by decantation.

U.S. Pat. No. 3,755,221 relates to fast cycling polyamide molding resins and suggests that instead of adding an aqueous CaF$_2$ slurry to the salt solution, the CaF$_2$ may be prepared in the salt solution.

U.S. Pat. No. 3,529,929 relates to an improvement in the double-decomposition process described in British Pat. No. 1,211,685 whereby CaF$_2$ of finer particle size is prepared by bringing together and rapidly mixing the aqueous solutions at a temperature ranging from 0° to 60° C.

One drawback associated with incorporating CaF$_2$ into a polyamide by the above-mentioned prior art techniques is that such techniques tend to cause foaming of the resulting molten polyamide/CaF$_2$ mixture which in turn causes processing difficulties, and in many instances renders further processing impossible. Another drawback is that the prior art techniques tend to result in agglomeration of CaF$_2$ in the polyamide. Another drawback associated with the prior art techniques is that the CaF$_2$ is first prepared by a rather tedious process involving numerous purification steps to remove any by-products which would inhibit polymerization of the polyamide if present during the polymerization process.

Accordingly, it is an object of the present invention to provide a simple process for incorporating CaF$_2$ into a polyamide which avoids the above-mentioned drawbacks of the prior art processes.

SUMMARY OF THE INVENTION

In accordance with the present invention, a process for incorporating CaF$_2$ into a polyamide is provided, comprising, reacting a calcium salt with a fluoride salt in molten polyamide to form CaF$_2$ dispersed therein.

In essence, the process of this invention involves the double-decomposition of a calcium salt and a fluoride salt in molten polyamide and differs from the prior art double-decomposition process, in that, molten polyamide instead of water is used as the reaction medium.

The process of the present invention is considerably less complicated than the prior art processes, in that, according to the present invention, the CaF$_2$ is prepared in the molten polyamide, whereas, according to the prior art processes, the CaF$_2$ is prepared in an aqueous medium and then subsequently mixed with the molten polyamide (with or without separation thereof from the aqueous medium).

Preferably, the calcium and fluoride salts are added to molten polyamide by blending or tumbling appropriate amounts of the salts with polyamide in particulate form (such as flake, granules, chips, dice etc.) so as to coat the polyamide with the salts. The coated polyamide is then melted whereupon the salts react with one another by the double-decomposition process to provide molten polyamide containing CaF$_2$ incorporation therein. The resulting molten mass may be extruded into shaped articles, such as filaments, ribbon, monofilament, molded articles or particular form for future use without encountering agglomeration of CaF$_2$ particles or processing difficulties such as foaming of the molten mass.

PREFERRED EMBODIMENTS OF THE INVENTION

Representative calcium salts which are capable of reacting with a fluoride salt in nylon and thus may be suitably used in carrying out the process of this invention include, but are not limited to, calcium hydroxide and the water soluble calcium salts, such as, calcium acetate, calcium bromide, calcium adipate, calcium caproate, calcium chloride, and calcium hypophosphite. Suitable fluoride salts include but are not limited to the water soluble salts, such as, potassium fluoride, sodium fluoride, ammonium fluoride and hexamethylene diammonium fluoride. It is intended that the salts may be used in their hydrous or anhydrous form. From the standpoint of commercial operations calcium acetate or bromide and potassium fluoride are preferred salts due to cost and availability thereof.

Preferred polyamides for use in carrying out the invention are those which have gained commercial importance such as nylon 66 (polyhexamethylene adipamide) and nylon 6 (polycaprolactam).

It has been found that better dispersion of the CaF$_2$ in the polyamide is obtained by using a mixture of two flakes, one being coated with the calcium salt and the other being coated with the fluoride salt. The amount of each coated flake can be selected so as to provide desired stoichiometric amounts of the two salts. If desired, uncoated flake may be mixed with the coated flakes. Of course, instead of flake some other particulate form may be used, such as, chips, granules, chopped or diced ribbon, cut monofilament (small cylinders), etc. Also, to aid in dispersion of the CaF$_2$ in the molten polyamide, the reaction of the salts can be carried out with agitation of the molten polyamide such as by stirring, blending or the like.

The process of this invention may be used to incorporated any amount of CaF$_2$ into a polyamide. Normally, in nucleating a polyamide, the amount of CaF$_2$ will range from 10 ppm (0.001% by weight) to 10,000 ppm (1% by weight), based on the weight of polyamide. Of course, lesser or greater amounts of CaF$_2$ may be incorporated into the polyamide, if desired.

The following examples are given to further illustrate the invention, but are not intended to limit the invention to the particular embodiments described therein. In the examples ppm (parts per million) is based on the weight of the polyamide (nylon 66 or nylon 6).

EXAMPLE 1

This example illustrates the preparation of nucleated nylon 66 fiber containing 500 ppm of $CaF_2$ uniformly dispersed therein by the process of this invention.

The following ingredients were added to and blended together in a twin-shell, cone-shaped blender blanketed with nitrogen: 218.7 grams of $KF.2H_2O$ in powder form, 181.4 kilograms (400 lbs) of dry nylon 66 flake, and 274.1 grams of $CaBr_2.2H_2O$ in powder form. The resulting flake coated with 1206 ppm of $KF.2H_2O$ and 1511 ppm of $CaBr_2.2H_2O$ was melt spun at a temperature of 280° C. into a 3988 denier yarn using a spinning unit equipped with a high shear intensive mixer to assure good dispersion of the $CaF_2$. The yarn was composed of 68 filaments of triskelion cross-section (modification ratio 2.31 to 1) and contained 500 ppm of $CaF_2$ and 1524 ppm of KBr. The test yarn was wound up at a speed of 320 meters per minute (350 ypm) and subsequently drawn to provide yarn having a denier of 1256. A control yarn was prepared under identical conditions except that in this instance an uncoated (vanilla) nylon 66 was used and a large volume of cooling air was employed. The test yarn and control yarn (modification ratio 2.36) had similar physical properties as shown in Table I below, where T is tenacity in grams per denier (dpf), E is elongation-to-break in % and B.S. is breaking strength in grams.

TABLE I

| Yarn Sample | As Spun T/E/B.S. | Drawn T/E/B.S. |
|---|---|---|
| Control | 0.91/498.2/3619 | 2.34/41.48/2973 |
| Test | 0.93/499.4/3720 | 2.31/42.41/2901 |

When textured, a sample of the control yarn developed a bulk of 28.5%, whereas a sample of the test yarn developed a bulk of 27.6% under identical conditions.

Samples of the as-spun test yarn and control yarn draw equally well over a 180° C. 2" (5.08 cm) pin at draw ratios of 2, 3, 4, and 5 to 1. Samples of the yarns were also dyed and tested to evaluate lightfastness characteristics using typical nylon 66 conditions with acid and dispersed dyes. No significant difference was observed between the test and control yarns. The yarns were also evaluated as pile in cut pile carpets with no significant differences being observed with regard to bulking, dyeing, luster and ozonefastness characteristics. Microphotographs (400×) taken of the cross-section of a filament of the test yarn showed the $CaF_2$ to be uniformly dispersed in the nylon.

The above results demonstrate that the process of this invention can be successfully employed to incorporate $CaF_2$ into a polyamide without adversely effecting either the properties of fiber shaped therefrom or the ease with which such fibers may be shaped. On the other hand the test yarn quenches more rapidly thereby permitting less cooling air to be used at the same modification ratio (MR), a higher MR to be obtained at the same air flow, or higher wind up speeds to be utilized.

EXAMPLE 2

This example illustrates the preparation of two nucleated nylon 6 fibers, one containing 2000 ppm of $CaF_2$ uniformly dispersed therein and the other 6000 ppm of $CaF_2$ uniformly dispersed therein by a preferred embodiment of the process of the invention.

45.36 kilograms (100 lbs.) of nylon 6 flake was added to a twin-shell, cone-shaped blender and blanketed with nitrogen. To the flake was added 437.5 grams of $KF.2H_2O$ (4822 ppm) and the mixture blended for 30 minutes. The resulting coated flake (Flake A) was removed from the blender and stored in a polyethylene-lined drum. Then, another 45.36 kilograms of nylon 6 flake was added to the blender and blanketed with nitrogen. To this flake was added 548.2 grams of $CaBr_2.2H_2O$ (6043 ppm) and the mixture blended for 30 minutes. Then, all of coated Flake A was combined with coated Flake B in the blender and the flakes were blended for one hour to provide Flake AB.

Flake CD was prepared from the following ingredients according to the above procedure:
90.72 kilograms (200 lbs) of nylon 6 flake
1312.5 grams of $KF.2H_2O$ (14,467 ppm)
1644.7 grams of $CaBr_2.2H_2O$ (18,130 ppm)

Flake AB and Flake CD were each melt spun at 250° C. into a 3785 and 3842 denier yarn, respectively, using the procedure described in Example 1. Each yarn was composed of 68 filaments of triskelion cross-section (MR=2.36±0.18). The test yarn (Yarn AB) prepared from Flake AB contained 200 ppm of $CaF_2$ and the test yarn (Yarn CD) prepared from Flake CD contained 6000 ppm of $CaF_2$. Each yarn was wound up at 365.76 mpm (400 ypm) with a cooling air flow rate of 1.7 cubic meters per minute (60 cfm). A control yarn was prepared from uncoated (vanilla) nylon 6 flake under the same conditions except the cooling air flow rate in this instance was 2.55 cmm (90 cfm). A sample of each yarn was drawn to a denier of about 1450 and another sample of each yarn was drawn to a denier of about 1250. The physical properties and dyeing characteristics of the yarns were substantially the same. Microphotographs (480×) taken of the cross-section of a filament of each of the test yarns showed the $CaF_2$ to be uniformly dispersed in the nylon.

EXAMPLE 3

This example illustrates the preparation of nylon 66 samples containing varying amounts of $CaF_2$ uniformly dispersed therein.

An initial batch of nylon 66 flake coated with 12,056 ppm of $KF.2H_2O$ and 15,108 ppm of $CaBr_2.2H_2O$ was prepared (sample 4). By dilution of this flake with vanilla nylon 66 flake (control), nylon 66 samples (1–3) were prepared containing from 200 to 2000 ppm of $CaF_2$ as shown in Table II.

TABLE II

| Sample | $KF.2H_2O$ ppm | $CaBr.2H_2O$ ppm | CaF ppm | KBr ppm | RV |
|---|---|---|---|---|---|
| Control | 0 | 0 | 0 | 0 | 47.77 |
| 1 | 482 | 604 | 200 | 610 | 51.17 |
| 2 | 1206 | 1511 | 500 | 1524 | 52.16 |
| 3 | 4822 | 6043 | 2000 | 6097 | 38.56 |
| 4 | 12056 | 15108 | 5000 | 15242 | 35.68 |

Samples 1–3 were prepared from a flake obtained by blending the above-mentioned coated flake with appropriate amounts of vanilla nylon flake in a blender and then drying the resulting flake under vacuum for 12 hours prior to use.

What we claim is:

1. A process for incorporating calcium fluoride into a nylon comprising reacting a calcium salt with a fluoride salt in a molten nylon.

2. The process of claim 1 wherein said salts are water soluble salts.

3. The process of claim 2 wherein the nylon is polyhexamethylene adipamide or polycaprolactam.

4. A process for incorporating $CaF_2$ into a nylon comprising coating a polyamide in particulate form with a calcium salt and a fluoride salt and then melting the resulting coated nylon to effect reaction of said fluoride salt with said calcium salt in the nylon melt.

5. The process of claim 4 wherein a first portion of said particulate nylon is coated with the fluoride salt and a second portion thereof is coated with the calcium salt.

6. The process of claim 4 wherein said salts are water-soluble salts.

7. The process of claim 6 wherein said fluoride salt is selected from the group consisting of potassium fluoride, sodium fluoride, ammonium fluoride and hexamethylene diammonium fluoride.

8. The process of claim 7 wherein said calcium salt is selected from the group consisting of calcium bromide, calcium adipate, calcium caproate, calcium acetate, calcium chloride, and calcium hypophosphite.

9. The process of claim 8 wherein the nylon is polyhexamethylene adipamide.

10. The process of claim 8 wherein the nylon is polycaprolactam.

11. The process of claim 8 wherein said salts are potassium fluoride and calcium bromide.

* * * * *